United States Patent
Derat

(10) Patent No.: US 10,374,728 B1
(45) Date of Patent: Aug. 6, 2019

(54) TEST SYSTEM AS WELL AS METHOD FOR OVER-THE-AIR TESTING

(71) Applicant: Rohde & Schwarz GmbH & Co. KG, Munich (DE)

(72) Inventor: Benoît Derat, Munich (DE)

(73) Assignee: Rohde & Schwarz GmbH & Co. KG, Munich (DE)

( * ) Notice: Subject to any disclaimer, the term of this patent is extended or adjusted under 35 U.S.C. 154(b) by 0 days.

(21) Appl. No.: 15/985,990

(22) Filed: May 22, 2018

(51) Int. Cl.
| | |
|---|---|
| H04B 17/00 | (2015.01) |
| H04B 17/10 | (2015.01) |
| H04B 17/29 | (2015.01) |
| H04W 24/06 | (2009.01) |

(52) U.S. Cl.
CPC ....... H04B 17/0085 (2013.01); H04B 17/102 (2015.01); H04B 17/29 (2015.01); H04W 24/06 (2013.01)

(58) Field of Classification Search
CPC ... H04B 17/0085; H04B 17/29; H04B 17/102
See application file for complete search history.

(56) References Cited

U.S. PATENT DOCUMENTS

| | | | | |
|---|---|---|---|---|
| 2003/0162566 A1* | 8/2003 | Shapira | ................... | H01Q 1/246 455/561 |
| 2012/0071107 A1* | 3/2012 | Falck | ....................... | H01Q 3/24 455/67.12 |
| 2013/0141160 A1* | 6/2013 | Ohkawara | ............. | H03F 1/3247 330/149 |
| 2016/0072594 A1* | 3/2016 | Yuan | ..................... | H04B 17/16 455/424 |

* cited by examiner

*Primary Examiner* — Kabir A Timory
(74) *Attorney, Agent, or Firm* — Christensen O'Connor Johnson Kindness PLLC

(57) ABSTRACT

A test system for over-the-air testing is described, the test system comprising a measurement antenna, a power combiner, and a mixer. The measurement antenna is a multiple polarization antenna that is configured to measure signals with at least two different polarizations. The measurement antenna has a first measurement port and a second measurement port via which a first signal portion and a second signal portion are provided, respectively. The power combiner has a first input port and a second input port. The power combiner is directly connected via its first input port with the first measurement port of the measurement antenna unit. The mixer is connected with the measurement antenna via the second measurement port. The mixer has an output port via which the mixer is connected with the second input port of the power combiner. Further, a method for over-the-air testing is described.

18 Claims, 2 Drawing Sheets

TEST SYSTEM AS WELL AS METHOD FOR OVER-THE-AIR TESTING

FIELD OF THE DISCLOSURE

Embodiments of the present disclosure relate generally to a test system for over-the-air testing as well as a method for over-the-air testing.

BACKGROUND

In the state of the art, it is known to measure the quality of an over-the-air (OTA) transmission, for instance the quality of a device under test, by taking the error vector magnitude (EVM) into account. The EVM is a quantity that is of high interest since it contains as a single value an aggregated information of the quality of the OTA transmission. In fact, the EVM is a measure used to quantify the performance of the OTA transmission since the EVM provides information regarding the deviation of an actual measured (already equalized) wave form with respect to an ideal wave form. Hence, the EVM indicates the deviations of the locations of the actual constellation points from the ideal locations due to various imperfections such as noise, phase noise, distortion and so on. So far, the error vector magnitude has been measured in a conducted fashion which means that a cable or similar is connected to the device under test for testing purposes.

However, new telecommunication standards such as 5G require to measure the error vector magnitude in a non-conducted fashion, namely over-the-air.

It is known that the error vector magnitude can be measured by taking signal portions of the signal received into account that relate to different polarizations with regard to the electric and/or magnetic field impinging on the antenna.

Since the information of at least two different polarizations is required for determining the error vector magnitude, either two single-port spectrum analyzers have to be used in the state of the art or a single two-channel spectrum analyzer has to be used. However, two-channel spectrum analyzers are currently not available for frequencies of the new radio telecommunication standard, namely the 5G telecommunication standard. Thus, two single-port spectrum analyzers correspond to the technique currently used.

The usage of two single-port spectrum analyzers, results in high costs for testing a device under test over-the-air with regard to the 5G telecommunication standard, for example the quality of the device under test with regard to the over-the-air transmission, since the spectrum analyzers are expensive that have to be used for determining the EVM.

Accordingly, there is a need for a more cost-efficient possibility to perform measurements over-the-air, in particular to measure the quality of a device under test with regard to its over-the-air characteristics.

SUMMARY

Embodiments of the present disclosure provide a test system for over-the-air testing, the test system comprising a measurement antenna, a power combiner, and a mixer. The measurement antenna is a multiple polarization antenna that is configured to measure signals with at least two different polarizations. The measurement antenna has a first measurement port and a second measurement port via which a first signal portion and a second signal portion are provided, respectively. The power combiner has a first input port and a second input port. The power combiner is directly connected via its first input port with the first measurement port of the measurement antenna unit. The mixer is connected with the measurement antenna unit via the second measurement port. The mixer has an output port. The mixer is connected via its output port with the second input port of the power combiner.

Further, embodiments of the present disclosure provide a method for over-the-air testing, with the following steps:
receiving a signal;
processing the signal received so as to obtain at least a first signal portion and a second signal portion of the signal received, the signal portions being assigned to different polarizations;
shifting the frequency of the second signal portion so that the frequency spectra of both signal portions processed are spaced from each other; and
combining the first signal portion and the second signal portion which frequency was shifted previously so as to obtain a combined signal.

Accordingly, the test system is capable of measuring at least one signal with two or more different polarizations wherein the measurement antenna splits the signal received into different signal portions having different polarizations. The respective signal portions are provided at the two different measurement ports of the measurement antenna. Since the first measurement port is connected with the power combiner, the first signal portion assigned to the first polarization is directly forwarded to the power combiner. In contrast thereto, the second signal portion assigned to the second polarization is forwarded to the mixer connected to the second measurement port. Hence, the frequency of the second signal portion is shifted up or down. Then, the second signal portion which frequency spectrum has been shifted due to the mixer is also forwarded to the power combiner so that the first signal portion and the second signal portion which frequency spectrum has been shifted previously are combined so as to obtain a combined signal that is outputted for analyzing purposes later. The combined signal comprises two bands due to the frequency shifting of the second signal portion.

For instance, the first signal portion is assigned to the horizontal polarization whereas the second signal portion is assigned to the vertical polarization. Accordingly, the information with regard to two different polarizations is obtained by the measurement antenna, namely the multiple polarization antenna.

The respective signal portions encompassing the information of the different polarizations are processed separately and independently of each other prior to their combination so that the frequency spectrum of the signal portion containing the information of one polarization is frequency shifted with respect to the other signal portion containing the information of the other polarization. As both signal portions are combined after the frequency shift, it is ensured that the respective frequency spectra do not overlap or rather interfere with each other.

Accordingly, two different signal portions relating to two different polarizations of the signal received are outputted as a single signal wherein the signal portions with regard to the different polarization information do not overlap in frequency constituting two bands of the combined signal.

In fact, the test system comprises a measurement antenna and a power combiner wherein the measurement antenna and the power combiner are connected via two signal lines via which the first signal portion and the second signal portion of the signal received are forwarded to the power combiner so that both signal portions can be combined.

In addition, the mixer being part of the test system is integrated in one of the signal lines so that the frequency spectrum of the signal portion routed via the mixer is shifted appropriately. Hence, it can be ensured that the frequency spectra of both signal portions processed by the test system are spaced from each other so that they do not interfere or rather overlap as already mentioned.

According to an aspect, the power combiner has a single output. Thus, the combined signal encompassing both signal portions is outputted via the single output of the power combiner. In the combined signal, the signal portions are spaced from each other in frequency so that the signal portions can be analyzed by a subsequent analyzing unit connected to the power combiner easily thanks to the frequency shift of the second signal portion. In other words, the combined signal has two bands each relating to a certain polarization.

Another aspect provides that a demodulating unit is provided that is connected with the power combiner. For instance, the demodulating unit is connected with the power combiner via the output of the power combiner. The demodulating unit is connected with the single output of the power combiner so that the demodulating unit receives the combined signal encompassing both signal portions originating from a single signal received wherein the signal portions relate to different polarizations. The frequency spectra of both signal portions are spaced from each other due to the mixing step done by the mixer.

The demodulating unit may be a single-port demodulating unit that has a single input port. Thus, a cost-efficient test system is provided since only one demodulating unit with a single input port is required to process data relating to at least two different polarizations. The single combined signal is received by the demodulating unit wherein the combined signal comprises the information with regard to the different polarizations.

Furthermore, the demodulating unit may have a processing unit, such as microprocessor, a ASIC, digital signal processor (DSP), digital circuitry, field programmable gate arrays (FPGAs), etc., that is configured to process a combined signal received from the power combiner. The power combiner provides the combined signal by combining the signal portions received via its input ports. The processing unit of the demodulating unit ensures that the combined signal received from the power combiner is demodulated so as to obtain information with regard to the different polarizations of the signal received.

For instance, the processing unit comprises a demodulation module configured to demodulate the combined signal so as to obtain symbols for further processing. Hence, the processing unit is configured to demodulate the combined signal received, for example in a similar manner as a real radio demodulator would demodulate the (combined) signal. Thus, the demodulation module may apply (digital) demodulation techniques such as a phase-shift keying (PSK) and/or a quadrature amplitude modulation (QAM) demodulation process so that the respective symbols of the combined signal are obtained, for example the symbols of the respective signal portions.

Generally, the demodulating unit is configured to obtain the symbols of the combined signal corresponding to the signal received after the demodulation.

In some embodiments, the demodulation of the at least two bands of the combined signal ensures that the symbols with regard to the different polarizations are obtained in an undisturbed manner. In other words, the symbols obtained by the demodulation provide the information with regard to the different polarizations that is required for EVM calculation even though a single demodulation unit with a single input port is used.

For instance, the processing unit comprises an error vector magnitude calculation module configured to calculate the error vector magnitude based on the combined signal. Accordingly, the processing unit is (also) enabled to calculate the error vector magnitude. The required information for calculating the error vector magnitude is already obtained due to the demodulation module that demodulates the combined signal received via the single input port of the demodulating unit.

The demodulating unit, for example the processing unit having the demodulation module and/or the error vector magnitude calculation module, can obtain the required information for calculating the error vector magnitude. This is ensured since the information regarding at least two different polarizations is forwarded to the demodulating unit by the combined signal so that the respective symbols can be demodulated appropriately thanks to the frequency shift.

Further, the demodulating unit is at least one of a spectrum analyzer and a vector signal analyzer. Accordingly, the processed signal can be analyzed appropriately by the respective demodulating unit. Generally, a vector signal analyzer is configured to demodulate (digitally) modulated signals and to measure the error vector magnitude (EVM).

Another aspect provides that the mixer is configured to shift the frequency of the signal portion received so that the frequency spectra of the signal portions processed by the power combiner are spaced from each other. This ensures that the information regarding both different polarizations can be forwarded to the demodulating unit connected to the power combiner in a single signal without any interference.

Hence, a single-port demodulating unit can be used for obtaining the required information with regard to the two different polarizations, namely the symbols after demodulation.

Further, the test system may be configured to measure the quality of an over-the-air transmission. In some embodiments, the test system is configured to measure the quality of a device under test with regard to its transmission properties.

An aspect provides that the combined signal is demodulated in order to obtain information regarding the polarizations. Thus, the combined signal that has been generated by combining the first signal portion and the second signal portion which frequency was shifted previously is demodulated so as to obtain the respective symbols providing the information that is required to calculate the error vector magnitude.

Further, an error vector magnitude may be determined. As the respective information for calculating the error vector magnitude is already obtained due to the demodulation, the error vector magnitude may be determined easily by using the symbols obtained within the two bands.

Another aspect provides that the error vector magnitude is determined based on the information obtained from the demodulation of the combined signal. The combined signal encompasses at least two bands relating to the at least two different polarizations of the signal received.

For instance, the first signal portion and the second signal portion which frequency was shifted previously are combined by a power combiner. Thus, both signal portions are combined in an easy and cost-efficient manner.

Furthermore, the first signal portion and the second signal portion are obtained by a multiple polarization antenna that receives the signal. Thus, the overall costs for over-the-air testing can be reduced due to the fact that a single antenna, namely a multiple polarization antenna, is used to obtain the information with regard to the at least two different polarizations of the signal received.

Another aspect provides that the combined signal is forwarded to a single-port demodulating unit that has a single input port. Thus, the required information for calculating the error vector magnitude can be obtained in a cost-efficient manner due to the fact a single demodulating unit is used that has a single input port.

Generally, the quality of an over-the-air transmission may be measured, for example the quality of a device under test used for over-the-air transmission.

For instance, the test system for testing the error vector magnitude over-the-air may comprise an anechoic environment, for instance an anechoic chamber that encompasses the device under test during the testing. The measurement antenna capable of transforming the signal received into an electric signal for further analyzing may also be assigned to the anechoic environment.

During the testing, the device under test and/or the measurement antenna may be moved with respect to each other so that a relative movement occurs. In some embodiments, the relative movement results in a measurement surface, for instance the surface of a sphere. Afterwards, the EVM quantity can be measured at each spatial location of the measurement surface, for example for each polarization due to the multiple polarization antenna used as the measurement antenna.

The mixing (frequency shift) of the at least one of the signal portions relating to the different polarizations ensures that the information required for determining the EVM are combined so that the information obtained from at least two different polarizations can be obtained by using one demodulating unit.

For determining the EVM quantity by using the information regarding the different polarizations, techniques like maximum ratio combining and/or statistical analysis may be used which are known in the state of the art.

DESCRIPTION OF THE DRAWINGS

The foregoing aspects and many of the attendant advantages of the claimed subject matter will become more readily appreciated as the same become better understood by reference to the following detailed description, when taken in conjunction with the accompanying drawings, wherein:

DETAILED DESCRIPTION

The detailed description set forth below in connection with the appended drawings, where like numerals reference like elements, is intended as a description of various embodiments of the disclosed subject matter and is not intended to represent the only embodiments. Each embodiment described in this disclosure is provided merely as an example or illustration and should not be construed as preferred or advantageous over other embodiments. The illustrative examples provided herein are not intended to be exhaustive or to limit the claimed subject matter to the precise forms disclosed.

Figure 1:
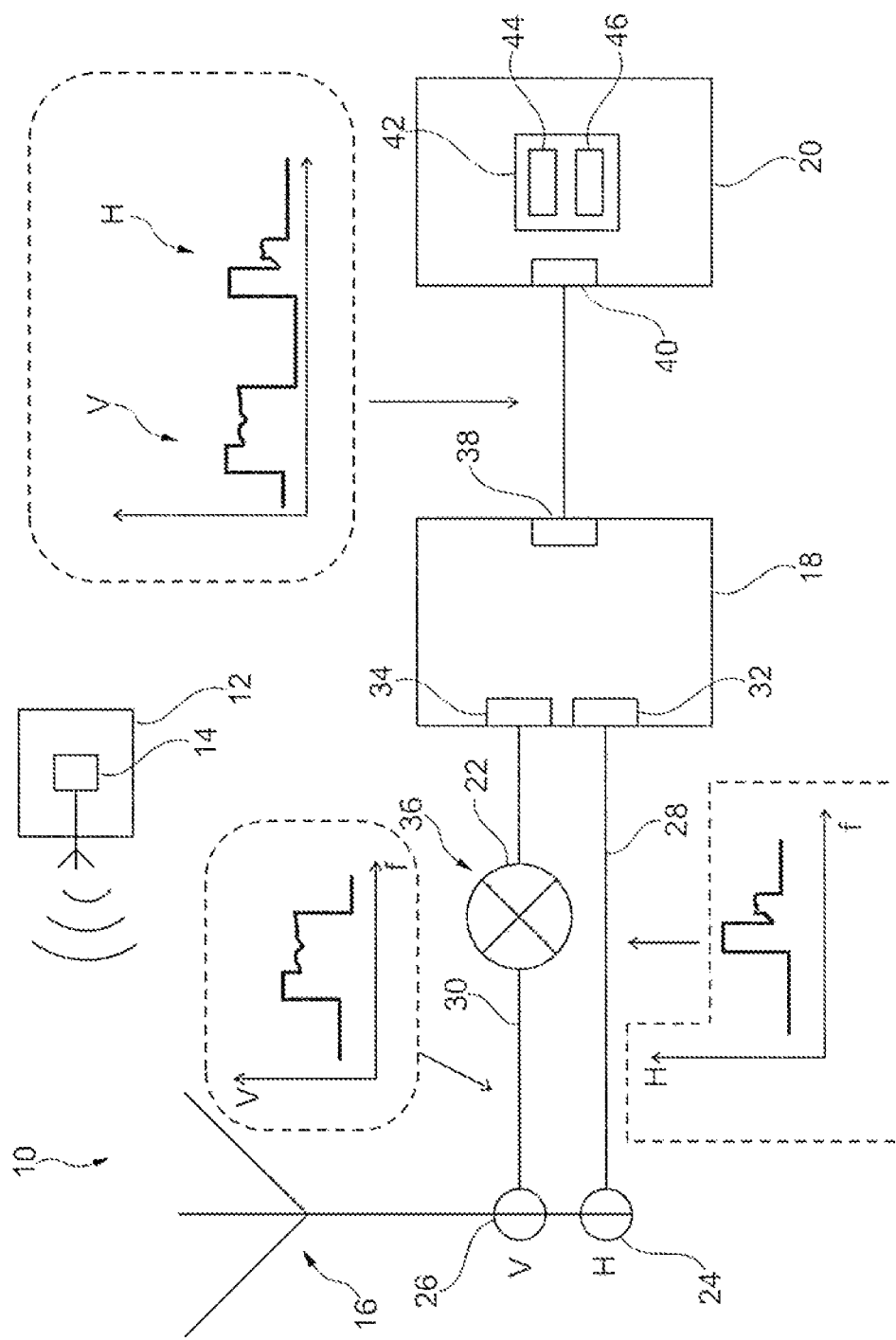
FIG. 1 schematically shows an overview of the test system according to the present disclosure.

In FIG. 1, a test system 10 is shown for over-the-air testing of a device under test 12 that is configured to transmit signals over-the-air. For this purpose, the device under test 12 may comprise a transmitter 14. The test system 10 comprises a measurement antenna 16, a power combiner 18 as well as a demodulating unit 20. Further, the test system 10 has a mixer 22 that is assigned to the measurement antenna 16 as will be described hereinafter. In some embodiments, at least the device under test 12 and the measurement antenna 16 may be encompassed by an anechoic environment such as an anechoic chamber.

Generally, the measurement antenna 16 is a multiple polarization antenna that is configured to measure signals with at least two different polarizations, for instance horizontally polarized signal portions as well as vertically polarized signal portions. For providing the respective information with regard to the different polarizations, the measurement antenna 16 has at least a first measurement port 24 as well as a second measurement port 26. Thus, the first measurement port 24 may be assigned to a first polarization, for instance a horizontally polarized signal portion, generally labelled as first signal portion, whereas the second measurement port 26 may be assigned to a second polarization, for instance a vertically polarized signal portion, generally labelled as second signal portion. This is also shown in FIG. 1 wherein the respective polarizations are indicated by "H" and "V". However, the polarizations may also be assigned in a different way to the measurement ports 24, 26 in some embodiments.

The measurement antenna 16 is connected with the power combiner 18 via two signal lines 28, 30 that are connected with the first measurement port 24 and the second measurement port 26, respectively. The power combiner 18 has a first input port 32 as well as a second input port 34 which are connected to the first signal line 28 and the second signal line 30, respectively. Accordingly, the first input port 32 of the power combiner 18 is connected with the first measurement port 24 of the measurement antenna 16 via the first signal line 28. Further, the second input port 34 of the power combiner 18 is connected with the second measurement port 26 of the measurement antenna 16 via the second signal line 30. The signal lines 28, 30 forward the respective signal portions obtained by the measurement antenna 16 to the power combiner as shown in FIG. 1.

In the embodiment shown, the first signal line 28 transmits the first signal portion, namely the horizontally polarized signal portion, to the power combiner 18, for example its first input port 32, whereas the second signal line 30 transmits the second signal portion, namely the vertically polarized signal portion, to the power combiner 18, for example its second input port 34. The respective signal portions are shown in FIG. 1 wherein both signal portions transmitted are assigned to similar frequencies so that their frequency spectra overlap.

The mixer 22 is interposed in the second signal line 30 so that it is located between the second measurement port 26 and the second input port 34 of the power combiner 18. Hence, the mixer 22 receives the second signal portion transmitted via the second signal line 30 and mixes the second signal portion so as to shift the frequency. Accordingly, the frequency spectrum of the second signal portion is shifted. For instance, the frequency of the second signal portion processed by the mixer 22 is shifted (mixed) up or down.

Further, the mixer 22 has an output port 36 that is assigned to the second input port 34 of the power combiner 18 so that the frequency shifted second signal portion is forwarded to the power combiner 18, for example its second input port 34. In general, the mixer 22 is configured to shift the frequency of the signal portion received, namely the second signal portion, so that the frequency spectra of both signal portions processed via the signal lines 28 and 30 are spaced from each other due to the mixing so that they do not overlap or rather interfere with each other.

As earlier mentioned, the first signal line 28 transmits the signal portion being assigned to the horizontally polarized signal portion whereas the second signal line 30 transmits the signal portion assigned to the vertically polarized signal portion. Both signal portions, namely the horizontally as well as the vertically polarized signal portions, are fed into the power combiner 18 via the respective input ports 32, 34 so that both signal portions are combined in order to obtain a single combined signal that is outputted by the power combiner 18 via its output 38.

In FIG. 1, the combined signal obtained by the power combiner 18 is shown. It becomes obvious that the combined signal has two bands which relate to the horizontally as well as the vertically polarized signal portions as indicated by "H" and "V". Accordingly, the combined signal comprises the information of both signal portions. However, the respective frequencies are shifted so that they do not overlap.

In the shown embodiment, the vertically polarized signal portion was mixed down by the mixer 22 so that both signal portions, namely the horizontally as well as the vertically polarized ones, are spaced from each other in frequency so that they do not overlap as shown in FIG. 1. In other words, the frequencies of the signal portions forwarded to the power combiner 18 are separated in frequency so that interferences are limited. However, the mixer 22 may also mix up the frequency of the respective signal portion in some embodiments.

The combined signal outputted via the output 38 is forwarded to the demodulating unit 20 that has a single input port 40 for receiving the combined signal that comprises the information regarding the vertically polarized signal portion as well as the horizontally polarized signal portion.

The combined signal received by the demodulating unit 20 is then analyzed within the demodulating unit 20 that has a processing unit 42 so as to demodulate the signal received appropriately in order to obtain symbols providing respective information with regard to the polarizations. Accordingly, the processing unit 42 comprises a demodulation module 44 used for demodulating the combined signal in order to obtain the symbols of both bands of the combined signal relating to the information of the vertically polarized signal portion as well as the horizontally polarized signal portion.

The processing unit 42 is further configured to determine an error vector magnitude so that the quality of the over-the-air transmission, for example the one of the device under test 12 with regard to its over-the-air characteristics, can be determined appropriately. For this purpose, the processing unit 42 may further comprise an error vector magnitude calculation module 46 that uses the information obtained by the demodulation module 44, namely the information with regard to the vertically polarized signal portion as well as the horizontally polarized signal portion of the signal received by the measurement antenna 16. In general, both modules 44, 46 may be established by a software module and/or a hardware module.

Figure 2:
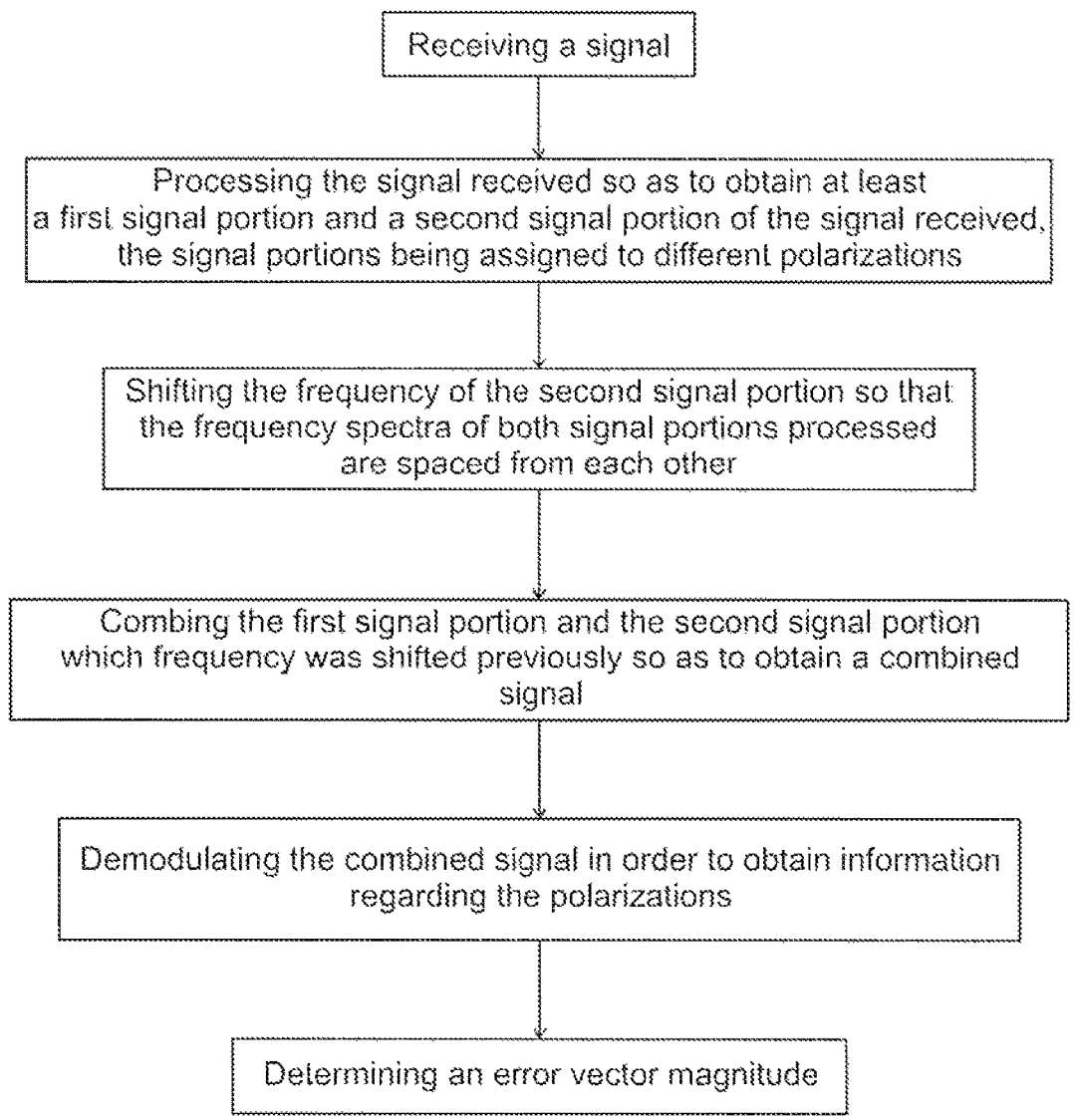
FIG. 2 schematically shows a flow-chart illustrating a method according to the present disclosure.

With respect to the flow-chart shown in FIG. 2, the method for over-the-air testing is described hereinafter that can be performed by using the test system 10 shown in FIG. 1.

First, a signal transmitted by the device under test 12 is received via the measurement antenna 16. The signal received is processed by the measurement antenna 16 being a multiple polarization antenna so as to obtain a first signal portion and a second signal portion being assigned to different polarizations of the signal received. Hence, a horizontally polarized signal portion as well as a vertically polarized signal portion are provided by the measurement antenna 16 for further processing as shown in FIG. 1, for example their measurement ports 24, 26.

The signal portions obtained are then forwarded to the power combiner 18 wherein the frequency of the second signal portion is shifted previously by the mixer 22 interposed so that the frequency spectra of both signal portions processed are spaced from each other. Hence, the frequency spectra of both signal portions do not overlap and/or interfere with each other after the mixing step.

Afterwards, both signal portions are combined by the power combiner 18 resulting in a combined signal having two bands which relate to the horizontally polarized signal portion as well as a vertically polarized signal portion of the signal received.

As mentioned earlier, the first signal portion, for instance the horizontally polarized signal portion, is directly forwarded to the power combiner 18 via the first signal line 28 whereas the second signal portion, for instance the vertically polarized signal portion, is frequency shifted previously so that the power combiner 18 receives a frequency shifted second signal portion via the second signal line 30.

The power combiner 18 combines both signal portions so as to obtain the combined signal with two bands that is outputted via the output 38. The outputted combined signal is then forwarded to the demodulating unit 20 that demodulates the combined signal in order to obtain information with regard to the at least two different polarizations of the single signal received.

The information with regard to different polarizations can be obtained by demodulating the combined signal within the demodulating unit 20. The information retrieved by the demodulating can be used for determining the error vector magnitude (EVM) that provides information with regard to the quality of the over-the-air transmission, for example the over-the-air characteristics of the device under test 12.

The error vector magnitude is calculated based on the information obtained from the demodulation of the combined signal wherein a single demodulating unit 20 with a single input port 40 is sufficient due to the fact that the frequency spectra of the different signal portions containing the information of different polarizations are shifted with respect to each other so that they do not overlap.

In fact, a combined signal is demodulated and analyzed by the demodulating unit 20 wherein the combined signal has two bands that are demodulated independently from each other so that the respective information required for determining the error vector magnitude is obtained.

Accordingly, a test system 10 as well as a method for over-the-air testing are provided that can be used to test an over-the-air transmission, for example the device under test 12, with regard to the 5G telecommunication standard in a cost-efficient manner since a single demodulating unit 20 with a single input port 40 is sufficient to obtain the information with regard to two different polarizations which is required for determining the error vector magnitude in a known manner.

One or more components herein described, such as the demodulating unit 20, the processing unit 42, etc., may include, in some embodiments, logic for implementing the technologies and methodologies described herein. This logic can be carried out in either hardware or software, or a combination of hardware and software. In some embodiments, the processing unit and/or demodulating unit includes one or more computing devices such as a processor (e.g., a microprocessor), a central processing unit (CPU), a digital signal processor (DSP), an application-specific integrated circuit (ASIC), a field-programmable gate array (FPGA), or the like, or any combinations thereof, and can optionally include discrete digital or analog circuit elements or electronics, or combinations thereof.

In an embodiment, the processing unit 42 includes a microprocessor and a memory storing logic modules and/or instructions, such as but not limited to the demodulation module 44 and the vector magnitude calculation module 46. In an embodiment, the processing unit 42 includes one or more ASICs having a plurality of predefined logic components. In an embodiment, the processing unit 42 includes one or more FPGA having a plurality of programmable logic components. In an embodiment, the processing unit 42 includes hardware circuit implementations (e.g., implementations in analog circuitry, implementations in digital circuitry, and the like, and combinations thereof). In an embodiment, the processing unit 42 includes combinations of circuits and computer program products having software or firmware instructions stored on one or more computer readable memories that work together to cause a device to perform one or more methodologies or technologies described herein.

The principles, representative embodiments, and modes of operation of the present disclosure have been described in the foregoing description. However, aspects of the present disclosure which are intended to be protected are not to be construed as limited to the particular embodiments disclosed. Further, the embodiments described herein are to be regarded as illustrative rather than restrictive. It will be appreciated that variations and changes may be made by others, and equivalents employed, without departing from the spirit of the present disclosure. Accordingly, it is expressly intended that all such variations, changes, and equivalents fall within the spirit and scope of the present disclosure, as claimed.

The embodiments of the invention in which an exclusive property or privilege is claimed are defined as follows:

1. A test system for over-the-air testing, the test system comprising:
   a measurement antenna, the measurement antenna being a multiple polarization antenna that is configured to measure signals with at least two different polarizations, the measurement antenna having a first measurement port and a second measurement port via which a first polarized signal portion and a second polarized signal portion are provided, respectively, wherein the first polarized signal portion is one of a horizontally polarized signal portion or a vertically polarized signal and the second polarized signal portion is the other one of the horizontally polarized signal portion or the vertically polarized signal;
   a power combiner having a first input port and a second input port, the power combiner being directly connected via the first input port to the first measurement port of the measurement antenna for receiving the first polarized signal portion; and
   a mixer being connected to the measurement antenna via the second measurement port for receiving the second polarized signal portion, the mixer having an output port connected to the second input port of the power combiner, the mixer being configured to shift the frequency of the second polarized signal portion so that frequency spectra of the first and second polarized signal portions to be received by the power combiner are spaced from each other,
   wherein the power combiner is configured to receive the first polarized signal portion from the measurement antenna and to receive the second polarized signal portion from the mixer, the power combiner further configured to combine the first polarized signal portion and the second polarized signal portion to form a combined signal having two bands that relate to the horizontally polarized signal portion and the vertically polarized signal portion.

2. The test system according to claim 1, wherein the power combiner has an output.

3. The test system according to claim 1, further comprising a demodulator connected with the power combiner.

4. The test system according to claim 3, wherein the demodulator is a single-port demodulator that has a single input port.

5. The test system according to claim 3, wherein the demodulator has a processor that is configured to process the combined signal received from the power combiner.

6. The test system according to claim 5, wherein the processor comprises a demodulation module configured to demodulate the combined signal so as to obtain symbols for further processing.

7. The test system according to claim 5, wherein the processor comprises an error vector magnitude calculator configured to calculate the error vector magnitude based on the combined signal.

8. The test system according to claim 3, wherein the demodulator includes an analyzer selected from the group consisting of a spectrum analyzer and a vector signal analyzer.

9. The test system according to claim 1, wherein the test system is configured to measure a quality of an over-the-air transmission.

10. A method for over-the-air testing, with the following steps:
   receiving a signal;
   processing the signal received so as to obtain at least a first polarized signal portion and a second polarized signal portion of the signal received, wherein the first polarized signal portion is one of a horizontally polarized signal portion or a vertically polarized signal and the second polarized signal portion is the other one of the horizontally polarized signal portion or the vertically polarized signal;
   shifting the frequency of the second signal portion so that frequency spectra of the first and second polarized signal portions are spaced from each other; and thereafter
   combing the first polarized signal portion and the second polarized signal portion so as to obtain a combined signal having two bands that relate to the horizontally polarized signal portion and the vertically polarized signal portion.

11. The method according to claim 10, further comprising demodulating the combined signal in order to obtain information regarding the polarizations.

12. The method according to claim 10, wherein an error vector magnitude is determined.

13. The method according to claim 12, wherein an error vector magnitude is determined based on information obtained from a demodulation of the combined signal.

14. The method according to claim 10, wherein the first polarized signal portion and the second polarized signal portion are combined by a power combiner.

15. The method according to claim 10, wherein the first polarized signal portion and the second polarized signal portion are obtained by a multiple polarization antenna that receives the signal.

16. The method according to claim 10, wherein the combined signal is forwarded to a single-port demodulating unit that has a single input port.

17. The method according to claim 10, wherein a quality of an over-the-air transmission is measured.

18. The method according to claim 11, wherein an error vector magnitude is determined based on the information obtained from the demodulation of the combined signal.

\* \* \* \* \*